(12) United States Patent
Johnson et al.

(10) Patent No.: US 6,856,730 B2
(45) Date of Patent: Feb. 15, 2005

(54) ATHERMAL PACKAGE FOR FIBER BRAGG GRATINGS WITH TWO OR MORE BONDING REGIONS

(75) Inventors: Alan E. Johnson, San Jose, CA (US); Edward P. Donlon, San Jose, CA (US); Frank D. Braun, San Jose, CA (US); Lap Van Hoang, Buena Park, CA (US)

(73) Assignee: Intel Corporation, Santa Clara, CA (US)

( * ) Notice: Subject to any disclaimer, the term of this patent is extended or adjusted under 35 U.S.C. 154(b) by 141 days.

(21) Appl. No.: 10/201,463

(22) Filed: Jul. 22, 2002

(65) Prior Publication Data

US 2004/0013364 A1 Jan. 22, 2004

(51) Int. Cl.[7] .............................................. G02B 6/34
(52) U.S. Cl. ..................... 385/37; 385/137; 359/566
(58) Field of Search .......................... 385/37, 134, 136, 385/137

(56) References Cited

U.S. PATENT DOCUMENTS

| | | | |
|---|---|---|---|
| 5,042,898 A | | 8/1991 | Morey et al. |
| 5,694,503 A | * | 12/1997 | Fleming et al. ............... 385/37 |
| 6,055,348 A | * | 4/2000 | Jin et al. ....................... 385/37 |
| 6,122,430 A | * | 9/2000 | Bookbinder et al. ......... 385/137 |
| 6,233,382 B1 | | 5/2001 | Olson et al. |
| 6,243,527 B1 | * | 6/2001 | Dawson-Elli ................ 385/136 |
| 6,377,727 B1 | * | 4/2002 | Dariotis et al. ................ 385/37 |
| 6,453,108 B1 | | 9/2002 | Sirkis |
| 6,477,299 B1 | * | 11/2002 | Beall et al. .................... 385/37 |
| 2002/0119884 A1 | * | 8/2002 | Buhrmaster et al. .......... 501/15 |

FOREIGN PATENT DOCUMENTS

| | | |
|---|---|---|
| WO | WO 01/02886 A1 | 1/2001 |
| WO | WO 01/61386 A2 | 8/2001 |
| WO | PCT US/03/20619 | 12/2003 |

* cited by examiner

*Primary Examiner*—John D. Lee
*Assistant Examiner*—Jennifer Doan
(74) *Attorney, Agent, or Firm*—Blakely, Sokoloff, Taylor & Zafman LLP

(57) ABSTRACT

An athermal package for fiber photonic devices includes at least two bonding regions at each end of the optical fiber containing the photonic device. At each end of the optical fiber, the bonding region nearest the photonic device (i.e., the inner bonding region) has a width that is less than that of the other bonding region (i.e., the outer bonding region). The smaller widths of the inner bonding regions allow for relatively precise control of the positions on the optical fiber that the inner bonding regions are attached. The larger widths of the outer bonding regions help provide reliable attachments.

29 Claims, 3 Drawing Sheets

ATHERMAL PACKAGE FOR FIBER BRAGG GRATINGS WITH TWO OR MORE BONDING REGIONS

FIELD OF THE INVENTION

Embodiments of invention relate generally to fiber photonic devices and, more specifically but not exclusively relate to packages for fiber photonic devices.

BACKGROUND INFORMATION

An optical transmission system transmits information from one place to another by way of a carrier whose frequency is in the visible or near-infrared region of the electromagnetic spectrum. A carrier with such a high frequency is sometimes referred to as an optical signal, an optical carrier, or a lightwave signal. Such optical signals are commonly propagated in optical fibers.

In some systems, photonic devices are built into or include a segment of optical fiber. For example, a Bragg grating can be implemented in a segment of optical fiber by forming regions of periodically alternating refractive indices in the fiber segment through which an optical signal is propagated. This type of Bragg grating is commonly referred to as a fiber Bragg grating (FBG) and is typically used as a wavelength selective filter in fiber optic communication systems. For example, the FBG can be used to filter out a particular wavelength (known as the Bragg wavelength). The Bragg wavelength depends on the average or effective refractive index of the optical fiber segment and on distance between gratings of the alternating regions (i.e., the period). As is well known, the Bragg wavelength of a FBG is dependent on the temperature and the strain on the fiber segment containing the FBG.

Typically, the optical fiber segment containing the FBG is attached under strain to a package that can be mounted on a board or otherwise incorporated into a unit or assembly. As schematically illustrated in FIG. 1 (PRIOR ART), the optical fiber segment is attached to a conventional package at two attachment points, with the FBG section being between the attachment points.

However, the size of the package can be sensitive to temperature. For example, the package can expand when the temperature changes, which in turn can change the strain applied to the optical fiber segment containing the FBG. This temperature dependent strain induced by the package can be used to augment or compensate the intrinsic temperature sensitivity of the FBG. Packages wherein an increase in temperature leads to a decrease in strain can have a reduced temperature sensitivity of the Bragg wavelength. Such packages are commonly referred to as athermal packages.

One conventional athermal package is schematically illustrated in FIG. 1 (PRIOR ART). As shown, an optical fiber 100 containing a FBG region 101 is attached to a package. The package has portions 102 and 103 that are made of one material and a portion 106 made of another material. Optical fiber 100 is attached under strain to portions 102 and 104 using bonds 104 and 105, with FBG region 101 being between the bonds. Bonds 104 and 105 are commonly solder, epoxy or other adhesive. Generally, such conventional solutions select the materials of portions 102, 103 and 106 so that when a temperature change occurs that causes portion 106 to expand (i.e., increasing the strain on the segment of optical fiber 100 between bonds 104 and 105), portions 102 and 103 expand so as to reduce the strain on the segment of optical fiber 100 between bonds 104 and 105. Ideally, the expansion of portions 102 and 103 exactly counteract the increase in strain caused by expansion of the portion 106 and the inherent temperature dependence of the FBG. Precise control of the dimensions of the package and the length of the optical fiber between bonds 104 and 105 are needed to achieve the desired temperature compensation of the package.

As seen in FIG. 1, bonds 104 and 105 are relatively large so that optical fiber 100 is reliably attached to the athermal package. However, this relatively large size makes it difficult to determine the exact attachment point of optical fiber 100 to bond 104 (and bond 105) and tends to cause the exact attachment point to vary from bond to bond. As previously described, precise control of the length of the portion of optical fiber 100 between bonds 104 and 105 is needed to achieve the desired temperature compensation. Thus, the relatively large size of bonds 104 and 105 can undesirably cause variations in the performance of the athermal package.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

Embodiments of the present invention are directed to an athermal package using a set of two or more bonding regions at each end of an optical fiber segment. The optical fiber segment can include or contain a photonic device such as, for example, a FBG. The set of two or more bonding regions at each end of the optical fiber segment includes an "inner" bonding region that is farthest from the end of the optical fiber segment. The inner bonding regions are formed so that the locations of the attachment points on the optical fiber segment can be more precisely controlled than in conventional athermal packages.

In one embodiment, the inner bonding regions are formed so as to be significantly smaller than the bonding regions used in conventional athermal packages. This smaller size allows for significantly more precision in the location of the attachment point than in conventional athermal packages. The other bonding regions of each set help improve the reliability of the attachment and need not be as precisely controlled as the inner bonding regions.

Although the following detailed description is directed to a FBG embodiment with two bonding regions at each end of an optical fiber segment, other embodiments can include other types of photonic devices and/or more than two bonding regions.

Figure 1:
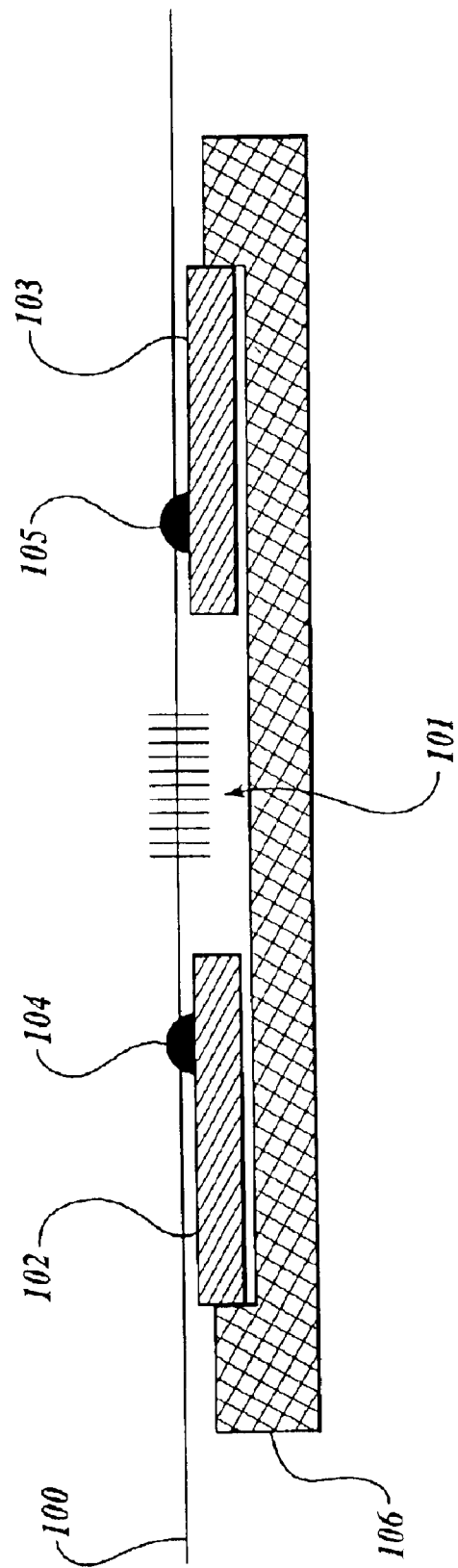
FIG. 1 is a schematic diagram illustrating a conventional athermal package for a FBG.
Figure 2:
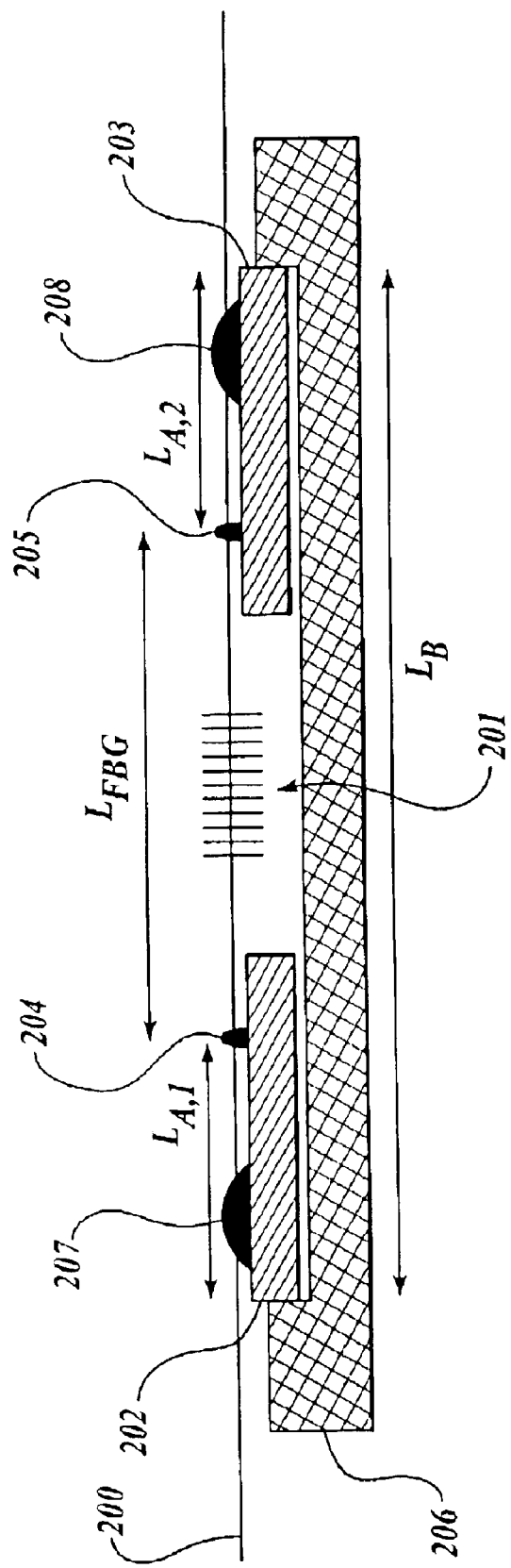
FIG. 2 is a schematic diagram illustrating an athermal package with two attachment points per end, according to one embodiment of the present invention.

FIG. 2 schematically illustrates an athermal package for use with optical fiber 200 containing a FBG region 201, according to one embodiment of the present invention. In this embodiment, the athermal package includes portions 202, 203 and 206 that are similar to portions 102, 103 and 106 (FIG. 1) of a conventional athermal package. Portions 202 and 203 are made of one material, while portion 206 is made from a different material. Portions 202 and 203 have operational lengths (defined as the distance from the contact point to portion 206 to inner bond 204 or 205 taken along the propagation axis of optical fiber 200) of $L_{A,1}$ and $L_{A,2}$, respectively, as shown in FIG. 2. The term propagation axis is used in this context to refer to the longitudinal axis of optical fiber 200 when attached to the athermal package. In addition, athermal package 200 includes inner bonding regions 204 and 205, and outer bonding regions 207 and 208.

The elements of this embodiment of the athermal package are interconnected as follows. Portion 202 has one end that is attached at or near one end of portion 206 (i.e., an end of portion 206 taken along the propagation axis of athermal package 200). Similarly, portion 203 has an end that is attached to the other end of portion 206. As shown in FIG. 2, the distance between the points where portions 202 and 203 are attached to portion 206 is indicated as $L_B$.

In one embodiment, portion 206 includes a groove or trench, with portions 202 and 203 being attached to portion 206 at the interior sidewalls at each end of the trench. For example, portions 202 and 203 may be pins that can be fitted into holes formed in interior sidewalls at the ends of the trench. In a further refinement, the ends of these pins are threaded so that portions 202 and 203 can be screwed into the interior end sidewalls of the trench formed in portion 206. In other embodiments, portion 206 is formed as a tube or cylinder that is closed at each end. Portions 202 and 203 can be hollow tubes attached to "tube-shaped" portion 206 as in the previous example, with optical fiber 200 disposed within the hollow portions of portions 202 and 203. Portions 202, 203 and 206 can have other shapes in other embodiments.

Inner bonding region 204 and outer bonding region 207 are formed on or in portion 202 and are used to attach two points of optical fiber 200 to portion 202. In one embodiment, bonding regions 204 and 207 are formed of an adhesive such as epoxy, solder, glass solder or other appropriate bonding material known in the art with optical fiber 200 being embedded in or running through the adhesive. Other suitable adhesives and mechanical bonding techniques can be used to form bonding regions 204 and 207 in other embodiments. In a further refinement, portion 202 may also include depressions or holes to receive the adhesive.

Still further, in this embodiment, inner bonding region 204 is formed to be significantly smaller than outer bonding region 207 (and the bonding regions used in the conventional athermal package of FIG. 1). For example, in one exemplary embodiment, inner bonding region 204 is formed from an epoxy with a length that is about one fifth that of outer bonding region 207 (formed from the same material). In other embodiments, the ratio of the bonding lengths could range from about two to more than ten. The ratio can depend on the adhesive and the material(s) of optical fiber at the attachment points on the optical fiber (e.g., jacket or cladding). In one embodiment, the distance between inner and outer bonding regions 204 and 207 has a value that is intermediate between the lengths of the inner and outer bonding regions. The distance between the inner and outer bonding regions may not be critical, although it may be advantageous to have the separation length of the same order of magnitude as the bond lengths.

In addition, optical fiber 200 is loaded when attached to athermal package 200. In one exemplary embodiment, optical fiber 200 is loaded to experience a strain of about 800–1000 microstrains when the temperature is at the lowest end of the expected or specified operating temperature.

Inner bonding region 205 and outer bonding region 208 are formed on or in portion 203 in a manner similar to that described above for forming bonding regions 204 and 207 on portion 202. Further, as indicated in FIG. 2, the length of the segment of optical fiber 200 between bonding region 204 and bonding region 205 (containing FBG region 201) is indicated as $L_{FBG}$.

In operation, as the temperature changes, the values of $L_B$, $L_{A,1}$ and $L_{A,2}$ will change according to the thermal coefficient of expansion of materials of portions 202, 203 and 206. The materials of portions 202, 203 and 206, the initial loading of optical fiber 200 and the initial values of $L_{FBG}$, $L_B$, $L_{A,1}$ and $L_{A,2}$ were all selected to achieve a desired thermal response so as to compensate or counteract the temperature dependent changes in the performance of the FBG. Because the widths of inner bonding regions 204 and 205 are relatively small, the value of $L_{FBG}$ can be more precisely controlled than in conventional athermal packages. The widths of outer bonding regions 207 and 208 are relatively large to increase the reliability of the attachment to optical fiber 200.

Further, because optical fiber 200 is attached to an athermal package at one or more points on either side of inner bonding region 204, the net stress at inner bonding region 204 is about zero. Likewise, the net stress at inner bonding regions 205 is about zero due to the one or more attachment points on either side of inner bonding region 205. This relatively small stress at inner bonding regions 204 and 205 helps increase the reliability of these relatively "thin" bonding regions compared to the reliability that would be expected in the absence of the outer bonding regions 207 and 208.

In contrast, the value of $L_{FBG}$ in a conventional athermal package is relatively imprecise due to the larger width of the bonding regions 104 and 105 (FIG. 1) compared to inner bonding regions 204 and 205. Thus, the actual thermal response of the conventional athermal package may undesirably differ from the desired response.

Figure 3:
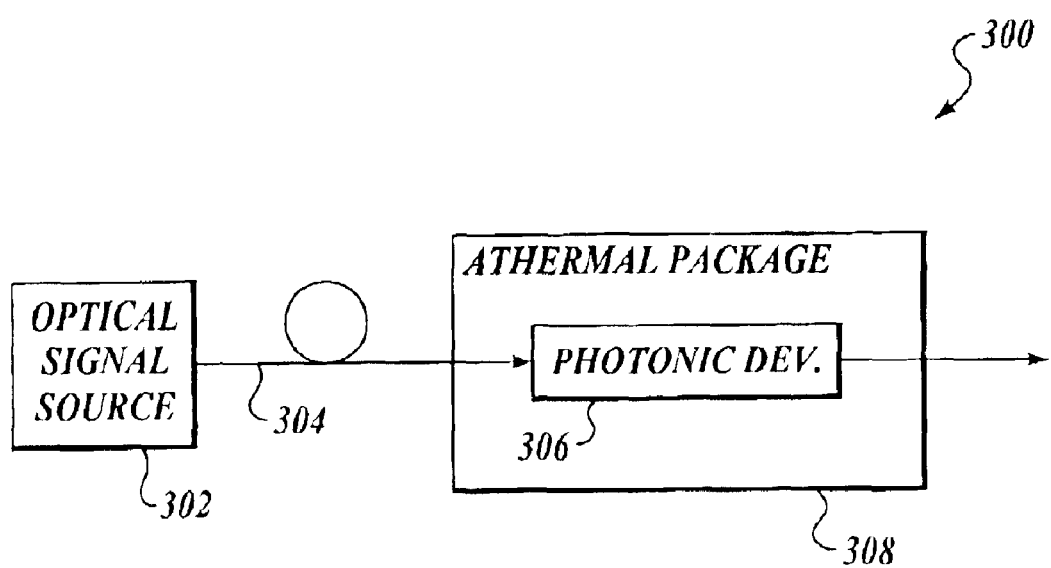
FIG. 3 is a block diagram of an optical system using an athermal package according to an embodiment of the present invention.

FIG. 3 is included to illustrate an exemplary optical system 300 that can use an athermal package according to an embodiment of the present invention. In this embodiment, optical system 300 includes an optical signal source 302, an optical fiber 304, a photonic device 306 coupled to one end of optical fiber 304, and an athermal package 308 attached to photonic device 306. Photonic device 306 can also be coupled to one or more other elements (not shown) of optical system 300.

Optical system 300, in this embodiment, is a wavelength division multiplexed (WDM) system and photonic device 306 is a fiber Bragg grating. In one embodiment, photonic device 306 is implemented in a section of optical fiber 304. In other embodiments, photonic device 306 can be spliced onto an end of optical fiber 304. Athermal package 308 is substantially similar to the embodiments described above in conjunction with FIG. 2.

In operation, optical signal source 302 can provide an optical signal to photonic device 306 via optical fiber 304. Photonic device 306 operates on the optical signal (e.g., filters out a wavelength component of the optical signal) and provides the operated signal to one or more other elements of system 300 as in known WDM systems. As previously described, athermal package 308 can be more easily/accurately fabricated with the desired temperature compensation and high reliability, compared to conventional athermal packages.

Embodiments of method and apparatus for an athermal package for photonic devices are described herein. In the above description, numerous specific details are set forth (such as the sizes, shapes and materials of various portions of the athermal package) to provide a thorough understanding of embodiments of the invention. One of ordinary skill in the relevant art will recognize, however, that embodiments of the invention can be practiced without one or more of the specific details, or with other methods, components, materials, etc. In other instances, well-known structures, materials, or operations are not shown or described in detail to avoid obscuring the description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The above description of illustrated embodiments of the invention, including what is described in the Abstract, is not intended to be exhaustive or to be limitation to the precise forms disclosed. While specific embodiments of, and examples for, the invention are described herein for illustrative purposes, various equivalent modifications are possible, as those skilled in the relevant art will recognize.

These modifications can be made to embodiments of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. An apparatus, comprising:
   a package attachable to an optical fiber segment that includes a photonic device between first and second points on the optical fiber segment, the package having:
   a first bonding region attachable to the first point of the optical fiber segment;
   a second bonding region attachable to the optical fiber so that the first bonding region is between the second bonding region and the photonic device, a size of the first bonding region being less than and/or approximately equal to one-half a size of the second bonding region;
   a third bonding region attachable to the second point of the optical fiber segment; and
   a fourth bonding region attachable to the optical fiber so that the third bonding region is between the fourth bonding region and the photonic device, a size of the third bonding region being less than and/or approximately equal to one-half a size of the fourth bonding region.

2. The apparatus of claim 1 wherein the first bonding region has a width along the optical fiber that is less than that of the second bonding region.

3. The apparatus of claim 2 wherein the third bonding region has a width along the optical fiber that is less than that of the fourth bonding region.

4. The apparatus of claim 2 wherein the photonic device comprises a fiber Bragg grating (FBG).

5. The apparatus of claim 1 further comprising fifth and sixth bonding regions formed proximate to the second and fourth bonding regions, respectively, a size of the fifth bonding region being less than and/or approximately equal to one-half a size of the sixth bonding region.

6. The apparatus of claim 1 wherein the package further comprises a first portion formed from a first material and a second portion, attached to the first portion, formed from a second material, the first and second materials having different thermal coefficients of expansion.

7. The apparatus of claim 6 wherein the first and second bonding regions are coupled to the second portion.

8. The apparatus of claim 6 further comprising a third portion formed from a material that is different from the first material, the third portion attached to the first portion and having a thermal coefficient of expansion that is different from that of the first portion.

9. The apparatus of claim 8 wherein the third and fourth bonding regions are coupled to the third portion.

10. The apparatus of claim 8 wherein the third portion is formed from the second material.

11. The apparatus of claim 1 wherein the first bonding region has a length along the optical fiber that is less than and/or approximately equal to one-half of a second bonding region length.

12. The apparatus of claim 1 wherein the third bonding region has a length along the optical fiber that is less than and/or approximately equal to one-half of a fourth bonding region length.

13. The apparatus of claim 1 wherein the a distance between the first bonding region and the second bonding region is less than and/or approximately equal to a difference in the size of the first bonding region and the second bonding region.

14. The apparatus of claim 13 wherein the distance between the first and second bonding regions is approximately the same order of magnitude as the difference in size of the first and second bonding regions.

15. An athermal package comprising
   first means for attaching an optical fiber to a first point on the optical fiber, the optical fiber including a photonic device between the first point and a second point on the optical fiber;
   second means for attaching the optical fiber to the athermal package, the first means for attaching being between the photonic device and the second means for attaching, the first means for attaching the optical fiber being less than and/or approximately equal to one-half a size of the second means for attaching the optical fiber;
   third means for attaching the optical fiber to the athermal package; and
   fourth means for attaching the optical fiber to the athermal package, the third means for attaching being located between the photonic device and the fourth means for attaching, the third means for attaching the optical fiber being less than and/or approximately equal to one-half a size of the fourth means for attaching the optical fiber.

16. The athermal package of claim 15 wherein the first means for attaching has a width along the optical fiber that is smaller than that of the second means for attaching.

17. The athermal package of claim 15 wherein the third means for attaching has a width along the optical fiber that is smaller than that of the fourth means for attaching.

18. The athermal package of claim 15 further comprising a first portion formed from a first material and a second portion, attached to the first portion, formed from a second material, the first and second materials having different thermal coefficients of expansion.

19. The athermal package of claim 18 wherein the first and second means for attaching are coupled to the second portion.

20. A system, comprising:
an optical signal source;
an optical fiber coupled to the optical signal source; and
a photonic device coupled to the optical fiber, wherein the photonic device is implemented between first and second points of a segment of optical fiber, the photonic device including a package attached to the optical fiber segment between the first and second points, the package having:
  a first bonding region attached to the first point of the optical fiber segment;
  a second bonding region attached to the optical fiber so that the first bonding region is between the second bonding region and the photonic device, a size of the first bonding region being less than and/or approximately equal to one-half a size of the second bonding region;
  a third bonding region attached to the second point of the optical fiber segment; and
  a fourth bonding region attached to the optical fiber so that the third bonding region is between the fourth bonding region and the photonic device, a size of the third bonding region being less than and/or approximately equal to one-half a size of the fourth bonding region.

21. The system of claim 20 wherein the first bonding region has a width along the optical fiber that is less than that of the second bonding region.

22. The system of claim 21 wherein the third bonding region has a width along the optical fiber that is less than that of the fourth bonding region.

23. The system of claim 21 wherein the photonic device comprises a fiber Bragg grating (FBG).

24. The system of claim 20 further comprising fifth and sixth bonding regions formed approximately to the second and fourth bonding regions, respectively, a size of the fifth bonding region being less than and/or approximately equal to one-half a size of the sixth bonding region.

25. The system of claim 20 wherein the package further comprises a first portion formed from a first material and a second portion, attached to the first portion, formed from a second material, the first and second materials having different thermal coefficients of expansion.

26. The system of claim 25 wherein the first and second bonding regions are coupled to the second portion.

27. The system of claim 25 further comprising a third portion formed from a material that is different from the first material, the third portion attached to the first portion and having a thermal coefficient of expansion that is different from that of the first portion.

28. The system of claim 27 wherein the third and fourth bonding regions are coupled to the third portion.

29. The system of claim 27 wherein the third portion is formed from the second material.

* * * * *

UNITED STATES PATENT AND TRADEMARK OFFICE
CERTIFICATE OF CORRECTION

PATENT NO. : 6,856,730 B2
DATED : February 15, 2005
INVENTOR(S) : Johnson et al.

It is certified that error appears in the above-identified patent and that said Letters Patent is hereby corrected as shown below:

Column 3,
Line 31, before "portion", delete "0".

Column 8,
Line 7, delete "approximately" and insert -- proximate --.

Signed and Sealed this

Twenty-fourth Day of May, 2005

JON W. DUDAS
*Director of the United States Patent and Trademark Office*